UNITED STATES PATENT OFFICE.

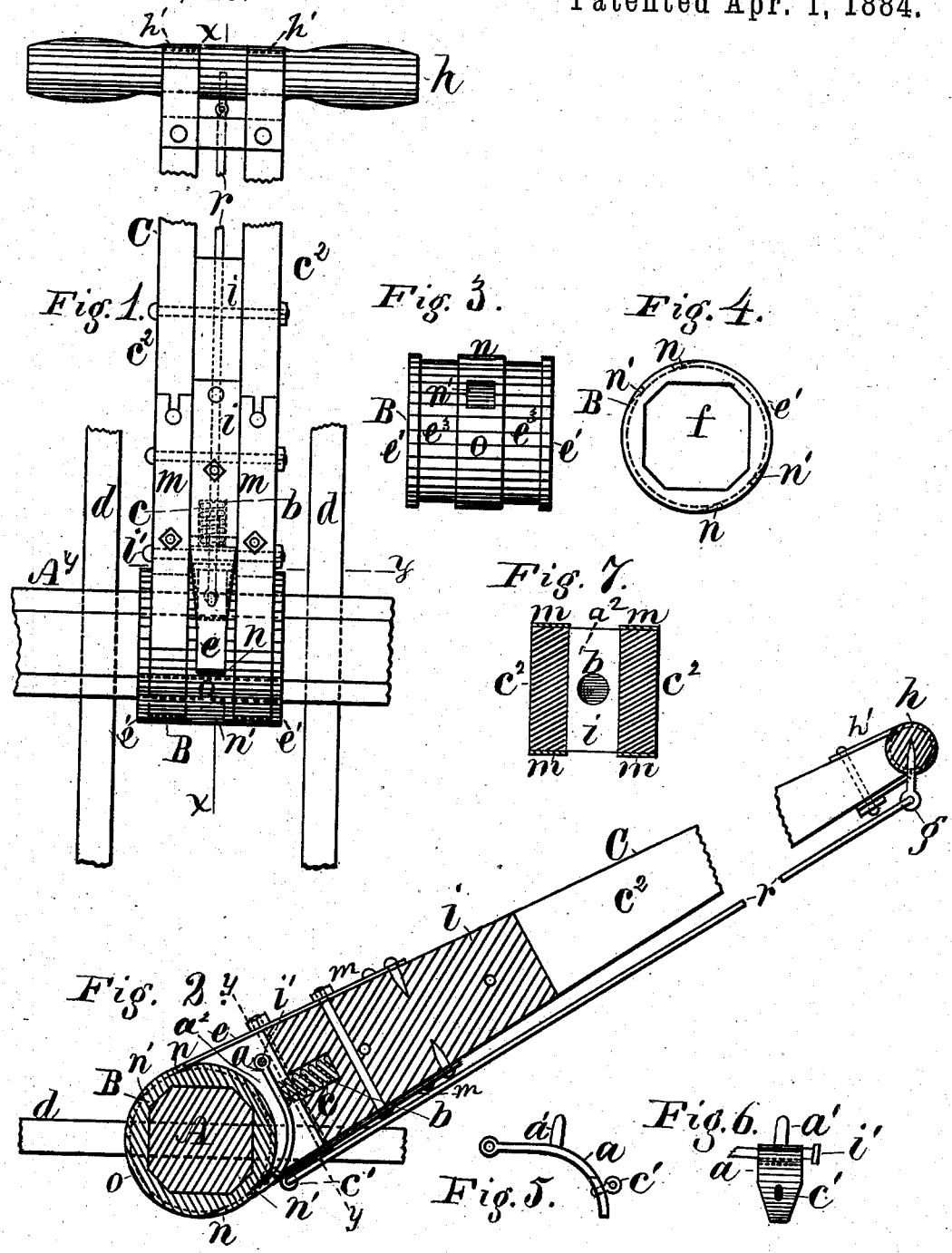

DAVID W. LONG, OF SPRINGFIELD, OHIO.

HORSE HAY-RAKE.

SPECIFICATION forming part of Letters Patent No. 295,928, dated April 1, 1884.

Application filed August 6, 1883. (No model.)

*To all whom it may concern:*

Be it known that I, DAVID W. LONG, a citizen of the United States, residing at Springfield, in the county of Clark and State of Ohio, have invented certain new and useful Improvements in Horse Hay-Rakes; and I do hereby declare the following to be a full, clear, and exact description of the invention, such as will enable others skilled in the art to which it appertains to make and use the same.

My invention relates to improvements in horse hay-rakes; and it consists in certain improvements in devices for operating the rake, which devices are connected with the handle and head of the same.

The object of my invention is to prevent the hay from being caught and entangled in the operating devices, and to protect those parts which are liable to get out of order from exposure, as well as to simplify the construction of the operating parts.

Figure 1 is a front view of the handle and the central part of the rake-head with which it is connected. Fig. 2 is a longitudinal section of the same on line $x\,x$, Fig. 1. Figs. 3 and 4 are front and end views, respectively, of the circular collar upon which the handle-frame is pivoted. Figs. 5 and 6 are side and rear views, respectively, of one of the pawls. Fig. 7 is a cross-section of the handle-frame through line $y\,y$, Figs. 1 and 2.

A is the rake-head, which is a beam of wood of the usual construction, with the wooden teeth $d$ secured therein. The beam is octagonal in cross-section, and has a ring or collar, B, which is cast in a single piece, its inner surface, $f$, corresponding in shape with the rake-head, over which it is driven (before inserting the teeth) to the center of the same. This collar has a raised central band, $o$, circular flanges $e'$ at the ends, forming flat grooves $e^3$ between them, around which grooves extend the straps $m$, which secure the handle-frame C to the collar, and within which the rake-head revolves.

Between the two bars $c^2$ of the handle-frame C is the block $i$. This block is secured in place by bolts, which extend through it and both side bars, $c^2$. The block $i$ does not extend quite down to the rake-head A, as will be seen by reference to Fig. 2, a space being left for the pivoted dog or pawl $a$. This latter is operated by a rod flexibly connected therewith, and passing through the eye $c'$, and connected at its rear end to the eyebolt $g$ in the handle $h$ at the rear end of the handle-frame C. This handle is operated to disengage the pawl $a$ from the notches $n'$ when the rake is to be dumped by turning it in the straps $h'$, by which it is secured to the bars $c^2$. The pawl $a$ is pivoted near the front of the handle-frame, and is curved backward and downward across the rake-head, its lower end engaging with one of the notches, $n'$, in the central band, $o$. There are two of these notches at diametrically-opposite sides of said band. The position of the handle $h$ when the pawl $a$ is engaged is shown in Fig. 2. A spiral spring, $c$, is located within a cavity, $b$, in the end of the block $i$. The stud $a'$, projecting rearward from the pawl $a$, extends within the spring. This stud prevents lateral displacement of the forward end of the spring, and retains it in engagement with the pawl. The broad flat spring $e$ acts as a pawl, and engages with one of the notches, $n$, in the collar B, to prevent the backward rotation of the rake, while permitting it to revolve forward when the load is dumped by raising the rake, so as to bring the points of its teeth in contact with the ground. The pawl $a$ is pivoted in the upper portion of the space $a^2$ by means of a bolt, $i'$, extending through the handle-bars $c^2$. The spring $c$ is thus entirely hidden, and the dog $a$ is also protected by the broad flat spring $e$, which is bolted upon the top of the block $i$, and extends forward over the space $a^2$, so as to entirely prevent any hay from entering the same. The dog $a$ being broad enough to almost fill the lower part of said space, and curving over the surface of the band $o$ on the collar B, there is little possibility of any of the hay becoming lodged from the operation of the rake on the rear of the head. The spring $c$ presses the pawl $a$ down upon the band $o$. When necessary to discharge the hay from the rake, the pawl is raised to release it from the notch $n'$. The end of the spring-pawl $e$ engages with the notch $n$, which is located near the notch $n'$ in the band $o$ of the collar B, but with its straight shoulder in the opposite direction.

By reference to the drawings it will be seen that both sets of notches $n$ and $n'$ are formed in the middle of the band $o$, leaving sufficient material on each side of the notch to prevent the sides of the latter from being broken out, and also to avoid any angle in the exposed part of the band.

I claim as my invention—

In combination with the rake-head, the bearing-collar cast in a single piece, and having a central band provided with notches, the side bars, $c^2$, pivoted on said collar, the block $i$, interposed between said side bars, and having a cavity, $b$, in the forward end, the spiral spring located in said cavity, the pawl $a$, pivoted in the space $a^2$, and having the stud $a'$, extending within said spring, the broad flat spring $e$, extending over said space $a^2$, and the operating devices connected with said pawl $a$, substantially as set forth.

In testimony whereof I affix my signature in presence of two witnesses.

DAVID W. LONG.

Witnesses:
B. C. CONVERSE,
SIMON KLOTZ.